(No Model.)
C. ROBERTS.
CAR WHEEL.
No. 430,887. Patented June 24, 1890.
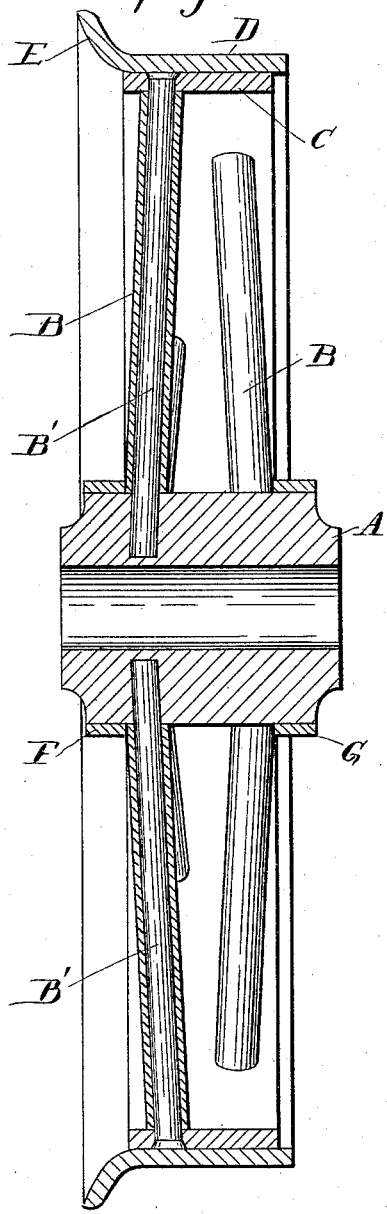
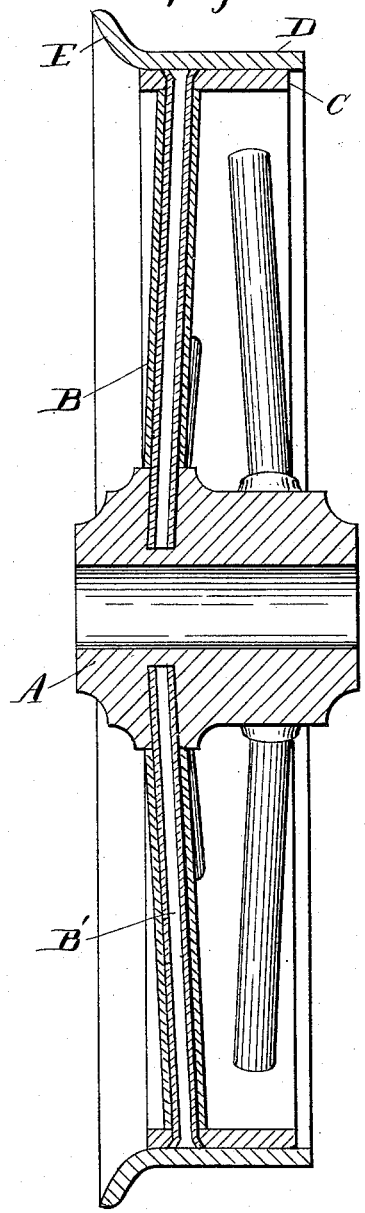
Witnesses:
Geo. C. Gregg.
N. L. Lindop.
Inventor
Cyrus Roberts
By Thos. S. Sprague & Son
Att'y.

UNITED STATES PATENT OFFICE.

CYRUS ROBERTS, OF THREE RIVERS, MICHIGAN.

CAR-WHEEL.

SPECIFICATION forming part of Letters Patent No. 430,887, dated June 24, 1890.

Application filed May 1, 1890. Serial No. 350,176. (No model.)

*To all whom it may concern:*

Be it known that I, CYRUS ROBERTS, a citizen of the United States, residing at Three Rivers, in the county of St. Joseph and State of Michigan, have invented certain new and useful Improvements in Car-Wheels, of which the following is a specification, reference being had therein to the accompanying drawings.

This invention relates to new and useful improvements in car-wheels; and the invention consists in the peculiar construction and arrangement of the parts whereby great strength is sought to be combined with lightness and reduced cost in manufacturing as compared with the solid cast-metal car-wheels, all as more fully hereinafter described, and shown in the accompanying drawings, in which—

Figure 1 is a vertical central section of my improved car-wheel, and Fig. 2 a modification thereof.

A is a cast-metal hub.

B and B are two sets of hollow exterior spokes extending between the hub and rim of the wheel, and B' B' are interior spokes passing through the hollow spokes and extending into the hub and into the rim of the wheel. The interior spokes B' B' are preferably formed of round metal bar or pipe and are cast into the hub, and the exterior spokes are preferably formed from metal pipe cut at the right length and sleeved upon the interior spokes. The two sets of spokes are inclined toward each other and arranged after the manner of constructing a wheel with staggered spokes, the spokes being also staggered upon the rim of the wheel.

The rim of the wheel consists of two rolled metal tires C and D. The inner metal tire C is provided with spoke-sockets, through which the interior spokes pass, being preferably secured therein by upsetting the ends of said spokes, the sockets being suitably countersunk on the outside of the inner rim. The outer metal tire D is provided with a car-wheel flange E, and is shrunk or pressed upon the inner tire and bears likewise against the ends of the spokes, which are flush with the outer face of the inner tire C.

Wrought-iron bands F and G are preferably shrunk or pressed upon the ends of the hub and abut against the outside of the two sets of spokes, respectively.

In constructing my wheel I build the interior spokes into the mold of the hub, in the proper manner to be cast into the hub, and support the outer ends of said spokes by the inner tire, which is laid on the follower-board and serves as a gage and support for the spokes, the exterior spokes being held in their proper relative positions by the interior spokes. After the hub is cast and taken out of the mold it will be evident that the hub in cooling has slightly shrunk away from the inner ends of the exterior spokes, which, as described, abut only against the hub (or extend only slightly into the hub.) To seat these spokes again firmly against the hub, I compress the wheel by suitable hydraulic pressure, after which the upsetting of the ends of the interior spokes is proceeded with, and, lastly, the outer tire is shrunk or pressed on.

In my construction of wheel it will be seen that the exterior spokes, in addition to largely adding to the effective strength of the spokes, perform the office of shoulders by means of which the spokes bear against the rim of the wheel.

To form the spokes B and B' in one piece would be a difficult matter on account of the angularity of the shoulders at the ends of the exterior spokes. In cutting them from pipe the proper angularity may be easily obtained, and by making the spokes and placing them in the mold with proper care the shoulders will be easily made to abut squarely against the rim and hub of the wheel, and thus when the wheel is properly finished the exterior spokes are rigidly held between the rim and hub of the wheel by the interior spokes, which are solidly cast into the hub and firmly held by the outer and inner rims.

The modification in Fig. 2 shows the interior spokes made of pipe and the bands on the hubs dispensed with. I also consider it optional in my construction to cast the hub with bosses, against which the inner ends of the exterior spokes abut.

What I claim as my invention is—

1. A car-wheel consisting of a cast-metal hub, a rim composed of two superimposed rolled metal wires, exterior hollow metal spokes abutting against the hub and rim of the wheel, and interior spokes passing through the exterior spokes and passing into the hub and through the inner tire of the wheel, substantially as described.

2. A car-wheel consisting of a cast-metal hub, a rim composed of an inner tire provided with countersunk spoke-sockets and an outer flanged tire pressed or shrunk on the inner tire, exterior hollow spokes abutting against the hub and against the inner tire, and interior spokes passing through the exterior spokes and cast at their inner ends into the hub and secured at their outer ends by upsetting into the spoke-sockets of the inner rim, substantially as described.

In testimony whereof I affix my signature in presence of two witnesses.

CYRUS ROBERTS.

Witnesses:
   M. B. O'DOGHERTY,
   GEO. A. GREGG.

It is hereby certified that in Letters Patent No. 430,887, granted June 24, 1890, upon the application of Cyrus Roberts, of Three Rivers, Michigan, for an improvement in "Car-Wheels," an error appears in the printed specification requiring correction, as follows: In line 2, page 2, the word "wires" should read *tires;* and that the said Letters Patent should be read with this correction therein that the same may conform to the record of the case in the Patent Office.

Signed, countersigned, and sealed this 8th day of July, A. D. 1890.

[SEAL.]

CYRUS BUSSEY,
*Assistant Secretary of the Interior.*

Countersigned:

C. E. MITCHELL,
*Commissioner of Patents.*